(12) United States Patent
Scott

(10) Patent No.: US 9,710,340 B2
(45) Date of Patent: Jul. 18, 2017

(54) REPLACEMENT OF A CORRUPT DRIVER VARIABLE RECORD

(71) Applicant: Hewlett-Packard Development Company, L.P., Houston, TX (US)

(72) Inventor: Jayne E. Scott, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 14/764,769

(22) PCT Filed: Jan. 31, 2013

(86) PCT No.: PCT/US2013/024141
§ 371 (c)(1),
(2) Date: Jul. 30, 2015

(87) PCT Pub. No.: WO2014/120205
PCT Pub. Date: Aug. 7, 2014

(65) Prior Publication Data
US 2015/0370653 A1 Dec. 24, 2015

(51) Int. Cl.
*G06F 11/00* (2006.01)
*G06F 11/14* (2006.01)
*G06F 11/07* (2006.01)
*G06F 11/22* (2006.01)
*G06F 9/44* (2006.01)

(52) U.S. Cl.
CPC ........ *G06F 11/1469* (2013.01); *G06F 9/4411* (2013.01); *G06F 11/0793* (2013.01); *G06F 11/1451* (2013.01); *G06F 11/2284* (2013.01); *G06F 2201/84* (2013.01)

(58) Field of Classification Search
CPC . G06F 11/0793; G06F 11/2284; G06F 21/572
See application file for complete search history.

(56) References Cited

U.S. PATENT DOCUMENTS

| 6,505,258 | B1 | 1/2003 | Sakarda et al. |
| 6,889,340 | B1* | 5/2005 | Bramley, Jr. ....... G06F 11/2284 714/30 |
| 7,043,664 | B1 | 5/2006 | Chiloyan et al. |
| 7,111,307 | B1* | 9/2006 | Wang ................. G06F 11/3668 711/152 |
| 2004/0025002 | A1 | 2/2004 | Cepulis et al. |
| 2004/0255106 | A1 | 12/2004 | Rothman et al. |
| 2007/0214349 | A1 | 9/2007 | Gu et al. |

(Continued)

OTHER PUBLICATIONS

International Search Report and Written Opinion, International Application No. PCT/US2013/024141, Date of Mailing: Jul. 12, 2013, pp. 1-7.

(Continued)

*Primary Examiner* — Charles Ehne
(74) *Attorney, Agent, or Firm* — HP Patent Department

(57) ABSTRACT

A BIOS storage device including driver variable records, a corruption detection engine and a corruption remediation engine, wherein the corruption detection engine is to evaluate a plurality of driver variable records stored in an area of a BIOS storage device for corruption, and a corruption remediation engine is to replace a corrupt driver variable record with a last known good version of the driver variable record.

17 Claims, 5 Drawing Sheets

(56) References Cited

U.S. PATENT DOCUMENTS

| | | |
|---|---|---|
| 2008/0235501 A1 | 9/2008 | Bailey et al. |
| 2009/0024872 A1* | 1/2009 | Beverly .............. G06F 11/0748 714/25 |
| 2009/0199048 A1 | 8/2009 | Ramegowda et al. |
| 2011/0131447 A1* | 6/2011 | Prakash ................ G06F 21/572 714/19 |
| 2012/0311415 A1 | 12/2012 | Mondello |

OTHER PUBLICATIONS

Leddy; "Avoid Corruption in Nonvolatile Memory," Aug. 20, 2003, pp. 1-8, UBM Tech.

\* cited by examiner

US 9,710,340 B2

REPLACEMENT OF A CORRUPT DRIVER VARIABLE RECORD

BACKGROUND

The variable service driver component of the Unified Extensible Firmware Interface (UEFI) addresses the reading and writing of driver variables to re-programmable, non-volatile memory, along with garbage collection. This component ensures variables are written properly and conform to a particular data structure. Additionally, the component may be required because, under the UEFI framework, multiple systems may be writing to and reading from an area of memory that holds the driver variable records. The re-programmable, non-volatile memory may also hold the Basic Input/Output System (BIOS). Under the UEFI standard, the driver variable record storage region of the BIOS storage device, which houses the driver and system variables in a linked-list structure, may be updated by Extensible Firmware Interface (EFI) drivers, EFI option read only memories (ROMs) associated with adaptor cards, and UEFI-aware operating systems.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The present disclosure is generally directed toward the detection and remediation of corrupt driver and system variable records, hereinafter simply referred to as variables that may be used by computer system's BIOS and other computer system components. The BIOS may be operating under the UEFI firmware industry standard and may be the interface between a computer system's hardware and the computer system's operating system (OS). The computer system may be a personal computer (PC), mobile computing device, or server, to name just a few. Further, the BIOS may reside on a re-programmable, non-volatile storage device (broadly referred to herein as a "BIOS storage device"). The BIOS storage device may be implemented as a Read Only Memory (ROM), a FLASH memory, or other similar type of storage, storage device and may be a part of the computer system. The BIOS storage device may be compartmentalized so that designated areas hold specific information. For example, an area that holds the firmware and drivers, and an area that holds the variables, or a variable storage area. The variables may be an interface between the device drivers of the computer and the software running on the computer, where a device driver may be the firmware that run's a sound card, a mouse, a keyboard, or a mass storage device, to name a few examples. The variables may be stored in a linked-list and may be used, updated, deleted, and reinitialized by the computer system's BIOS or other system components.

Figure 1:
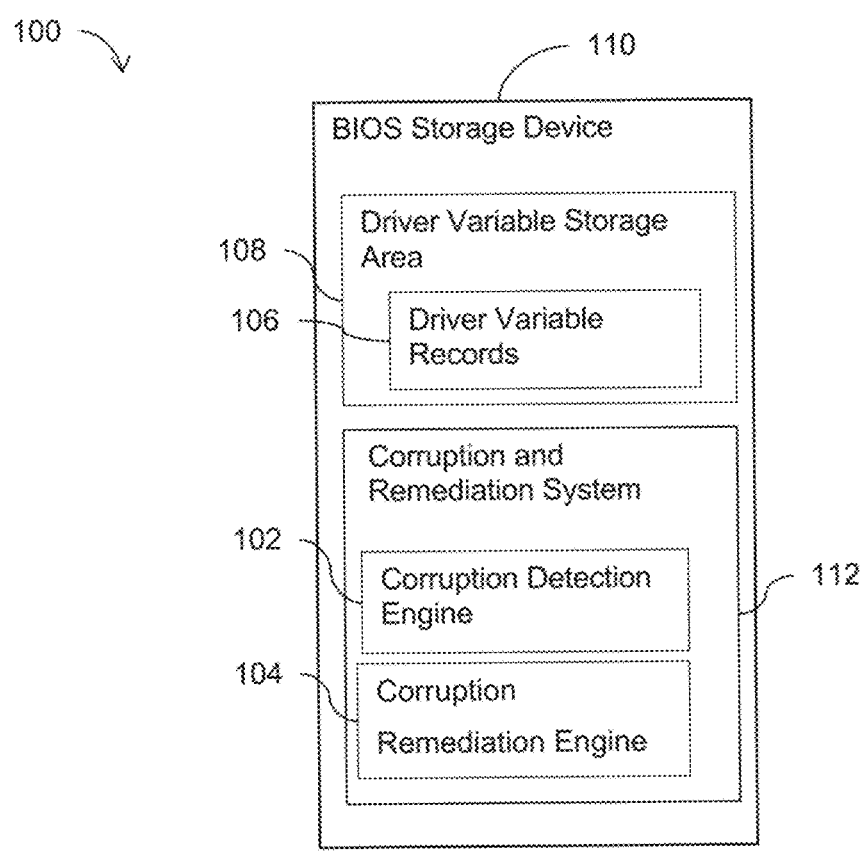
FIG. 1 shows an example of a corruption and remediation system in accordance with various examples.

FIG. 1 shows an example of a corruption and remediation system 100 in accordance with various examples and that may be implemented by an illustrative computer system. The system 100 may comprise a corruption detection engine 102, a corruption remediation engine 104, a plurality of driver variable records 106 stored in a driver variable storage area 108 and a BIOS storage device 110. The BIOS storage device 110 may contain the corruption detection engine 102, the corruption remediation engine 104, and the driver variable storage area 108. The plurality of driver variable records 106 may be stored in a linked-list structure. Additionally, the driver variable records 106 may be evaluated by the corruption detection engine 102 for corrupt variables. Corrupt variables may be replaced by the corruption remediation engine 104.

Figure 2:
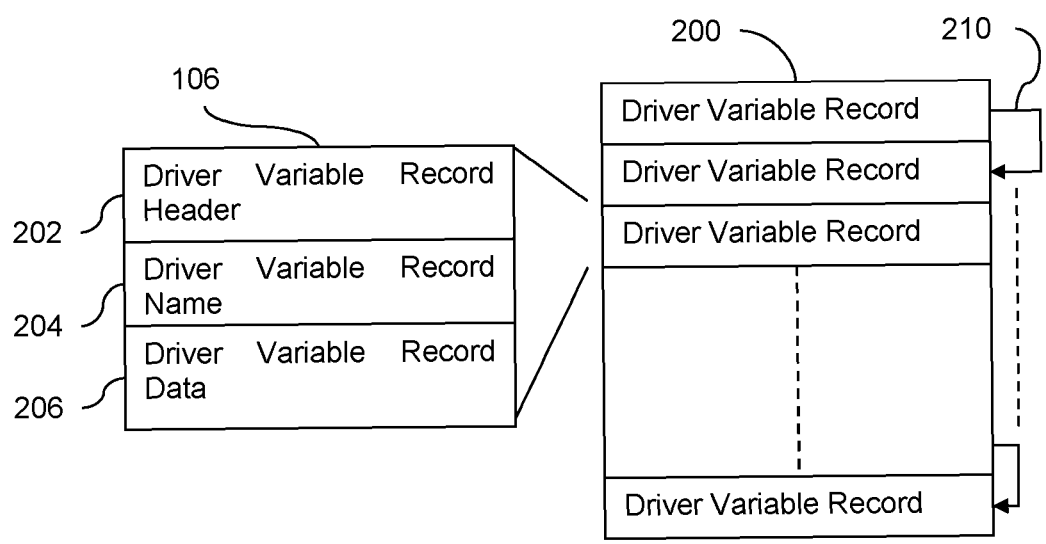
FIG. 2 shows an example of a driver variable record and driver variable records stored in a linked-list in accordance with various examples.

FIG. 2 shows an example of a driver variable record 106 contained in a linked-list 200. Each of the driver variable records 106 may comprise three parts—a driver variable record header 202, a driver variable record name 204, and the driver variable record data 206. The header 202 may contain the variable structure definition and may inform computer system using that variable 106 of the size of the variable, a name of the component using the variable, and whether the variable is current or marked for deletion. After the header 202 is the driver variable name 204 followed by the driver variable data 206. Additionally, since the header 202 gives the variable's name and data size, the system 100 may be able to calculate where the next variable should be in the linked-list 200 if the header 202 becomes corrupt.

The driver variable records 106 may be stored in the form of a linked-list 200 in the driver variable storage area 108. Each variable 106 may provide a pointer, such as pointer 210, that points to the beginning of the next variable 106 in the linked-list 200. The pointer 210 may be contained in the variable 106's header 202 and may be used by the corruption detection engine 102 to evaluate the driver variable records 106. The driver variable records 106 may be evaluated for bad headers 202 or bad links 210 by the corruption detection engine 102.

The variables 106 may generally be used to store configuration information for user data, administrator name, and preferences, to name a few examples. More specifically, one system variable is titled BootOrder and may be defined by the UEFI specification. The BootOrder variable may contain the order the system should follow when booting, such as hard disk, then USB drive, then network adaptor, etc. Additional variables, such as the platform key (PK) and key exchange keys (KEK) variables may contain certificates needed to add and update other authenticated variables.

The variables 106 may be updated by a UEFI-aware operating system (OS), the firmware, or EFI option ROMs. As the variables 106 are updated, the old variable versions may be marked for deletion. This updating process may continue until the variable storage area 108 has been filled with updated variables and old versions marked for deletion. The variable storage area 108 may be of limited size, 64 kbytes for example, which may limit the number of variables 106 that are stored at any one time. As such, once the variable storage area 108 becomes full, a variable service driver associated with the illustrative computer system's firmware may perform a garbage collection operation in which it removes all the driver and system variables marked for deletion. The remaining variables 106 may be concatenated to re-form a new linked-list 200 and may then be re-written to the variable storage area 108. Throughout this process, some of the variables 106 may become corrupt either due to the garbage collection operation or due to the driver or function that updated them with erroneous information. The corruption may be shown by either a bad link 210 or a bad header 202 of one of the driver variable records 106. A corrupt driver variable record 106 may lead to computer system hang-up or failure.

To combat this potential corruption, a variable corrective driver is added to the computer system's BIOS. The variable corrective driver may be used to periodically review the variable storage area 106 for corruption and may be implemented by the corruption detection engine 102 and the corruption remediation engine 104. The variable corrective driver may evaluate the links 210 in the linked-list 200 or the header's 202 of the variables 106 for corruption. Corruption may present itself in the form of a bad link 210, meaning the offset location listed in a variable 106's header 202 points to the wrong location. Corruption may also present itself in the form of a bad header 202, which may be a header 202 that contains the wrong driver identification information, for example. If a corrupted variable is found, the variable corrective driver may mark the corrupt variable to be deleted and re-write all variables from the first corrupted variable to the end of the linked-list with their last known good version.

Alternatively, the variable corrective driver may replace the corrupt variable with a default version for that variable, or erase the entire variable storage area 108 of the BIOS storage device 110. Erasing the entire variable storage area may cause the illustrative computer system's BIOS to re-initialize, which may restore all the plurality of variables 106 in the variable storage area 108 to their default values.

The variable corrective driver may be added to the BIOS's driver execution environment (DXE) module, the system manageability module (SMM), the runtime services module, or all three. Alternatively, the variable corrective driver may be stand-alone code associated with other computer system firmware.

The variable corrective driver may be scheduled to run periodically by configuring it to evaluate the variable storage area after a set number of writes, for example after every 10 writes, or it may be attached to a timer so that it runs every few seconds or milliseconds. However, the running of the variable corrective driver may be dynamically set from within the BIOS to run more or less frequently depending on computer system's operating activity.

Figure 3:
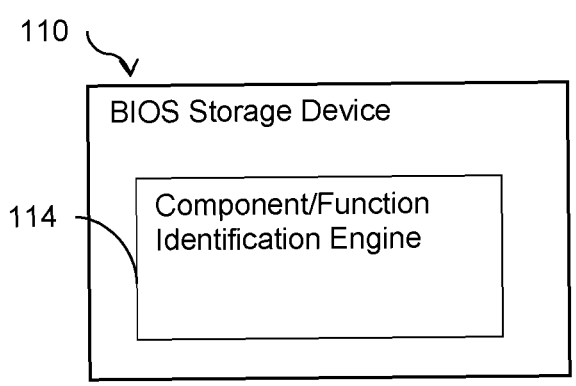
FIG. 3 shows an alternative example of a corruption and remediation system in accordance with various examples.

Additionally, in regards to FIG. 3, the BIOS storage device 108 may also include a component/function identification engine 114 that may have each component and function that updates the variables 106 in the variable storage area 108 identify themselves as part of the data being updated in the variables 106. The updating function or component may identify themselves in the variable 106's header 202, for example. The component/function identification engine 114 may also be a part of the variable corrective driver along with the engines 102 and 104. Then, when the variable corrective driver discovers an invalid, or corrupt, variable, the variable corrective driver may log the offending entry using pre-established logging methods. By reviewing the identification information contained in the corrupt variable, the computer system may block the offending component from writing to the variable storage area 108 from that point on, or until the offending component is investigated. Or, the computer system may alert a system agent to go and de-bug the offending component.

FIG. 1 illustrates an example of a corruption and remediation system 112 in accordance with various examples and that may be implemented by an illustrative computer system implementing the BIOS storage device 110. The illustrative computer system may include various engines that provide the system with the functionality described herein. The illustrative computer system may include the corruption detection engine 102 and the corruption remediation engine 104. Although the two engines 102 and 104 are shown as separate engines in FIG. 1, in other implementations, the functionality of the two engines may be combined into a single engine and may implement the function discussed above in regards to the variable corrective driver. Moreover, the illustrative computer system may include the component/function identification engine 114, which may also be combined with the two engines 102 and 104 into a single engine.

Figure 4:
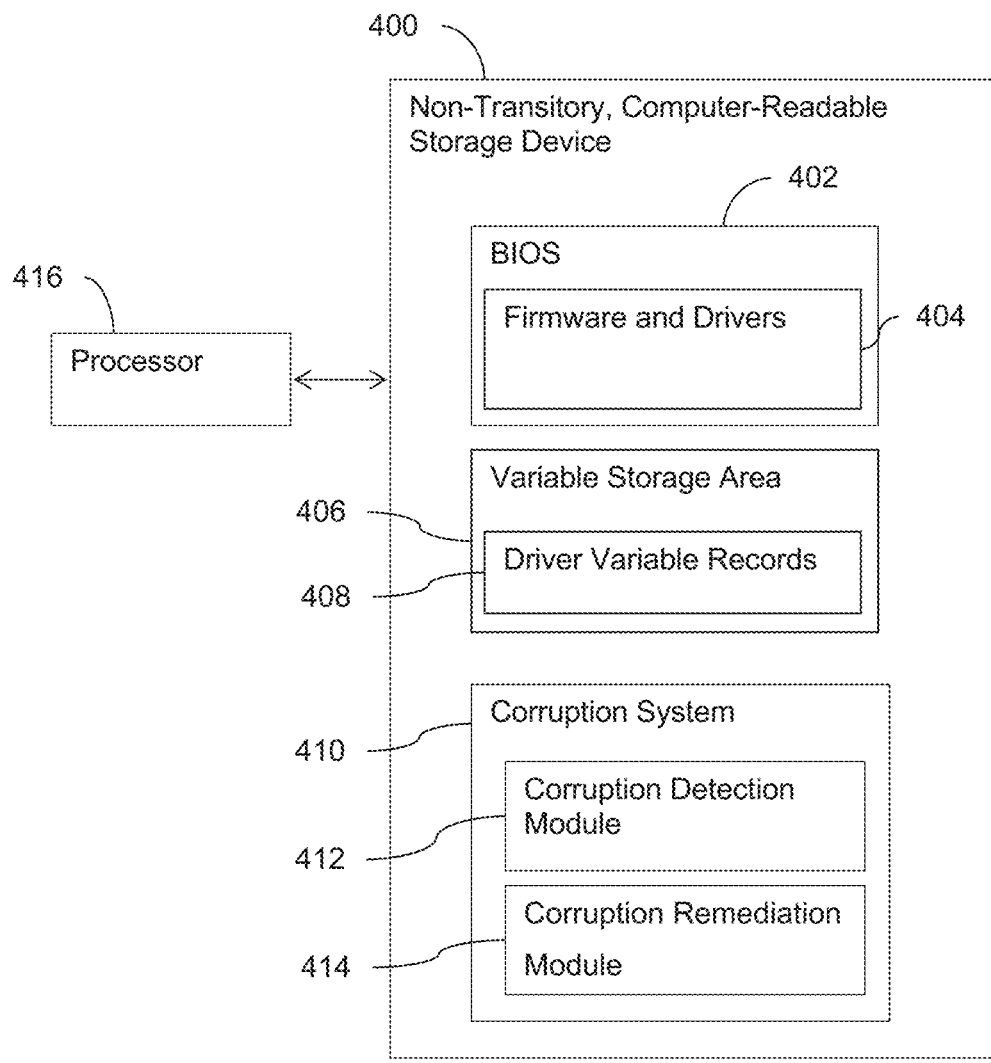
FIG. 4 shows an illustrative implementation of a corruption and remediation system in accordance with various examples.

In some examples of the illustrative computer system, each engine 102, and 104 may be implemented as a processor executing software. FIG. 4, for example, shows one suitable example in which a processor 416 is coupled to a non-transitory, computer-readable storage device 400. The non-transitory, computer-readable storage device 400 may be implemented as non-volatile storage, for example, as re-programmable, non-volatile storage, as electrically erasable programmable read only memory (EEPROM), or as flash memory.

The non-transitory, computer-readable storage device 400, which is or may be the BIOS storage device discussed above, is shown in FIG. 4 to include a software module that corresponds functionally to each of the engines of FIG. 1. The software modules may include a corruption detection module 412 and a corruption remediation module 414. Additional modules may be included in the BIOS 402, which may include firmware and drivers 404, for example, a variable service driver. Each engine of FIG. 1 may be implemented as the processor 416 executing the corresponding software module of FIG. 4.

Figure 5A:
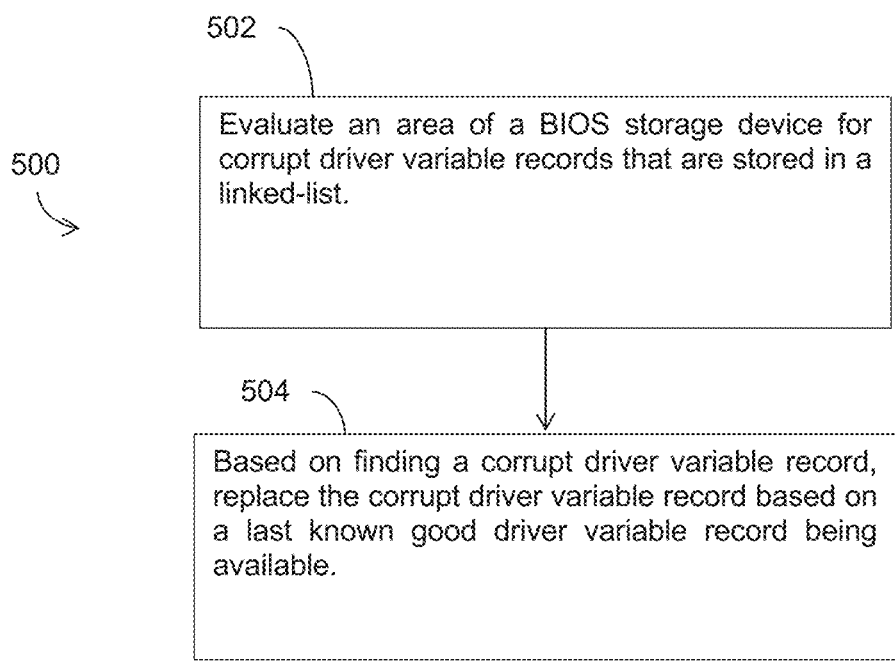
FIGS. 5A and 5B show methods in accordance with various examples.

The functions performed by the engines 102 and 104 of FIG. 1 and the modules 412 and 414 of FIG. 4 will now be described with reference to the flow diagrams of FIGS. 5A and 5B. The method 500 begins at block 502 with evaluating a variable storage area, such as variable storage area 406, of the non-transitory computer-readable storage device 400 for corrupt variables. The variable storage area 406 may include driver variable records 408, also referred to as variables 408 stored in a linked-list structure, such as linked-list 200. The variables 408 may periodically become corrupt through the standard operation of an illustrative computer system that may be implementing the device 400 or the system 100.

As system and peripheral drivers are functioning in the illustrative computer system they may save changes to their variables 408 by writing updates to the variables stored in the variable storage area 406. As these changes are made, the old versions of the variables 408 may be marked for deletion, and the new variable versions may be written into the variable storage area 406. This process may be performed until the storage area 406 is filled with data, for example when all 64 k bytes allocated for the variable storage area 406 are used. When there is no more space to use for updating variables 408, a garbage collection operation may be ran by a runtime service variable driver associated with the firmware and drivers 404. This may result in all variables 408 marked for deletion to be deleted, the remaining variables 408 marked current may then be concatenated to form a new linked-list that may be written back to the variable storage area 406.

After a pre-determined number of writes have been executed in the variable storage area 406, including garbage collection writes, the corruption detection engine 102 may be called upon by the illustrative computer system to search for corrupt variables. The corruption detection engine 102 may start at the top of the linked-list of variables 408 stored in the variable storage area 406, then move along the list evaluating the linked-list for bad links. Alternatively, the corruption detection engine 102 may move along the linked-list evaluating each variable 408 for bad information contained in their headers, such as header 202. Either a bad link or a bad header may signify a corrupt variable. For example, a header may be determined to be bad because a StartID, which flags the beginning of each variable, is incorrect. For another example, a header may be determined to be bad due to a wrong VendorGuid identifier being used when the variable was last updated. The size of the variable contained in the header may also be invalid. Further, since the variables are stored in a linked-list, the link, or pointer 210 to the next variable, may be corrupt. A corrupt link or pointer may point to a wrong location further down the list instead of to the header of the next variable in the list. Because the variables are stored as a linked-list, all variables after a corrupt link may also be corrupt.

The method 500 continues at block 504. Based on finding a corrupt driver variable record, the method 504 begins by replacing the corrupt driver variable record based on a last known good driver variable record being available. A last known good variable may be available if a garbage collection has yet to be run by the illustrative computer system. In some implementations, this operation may be performed by the corruption remediation engine 104 (FIG. 1).

Figure 5B:
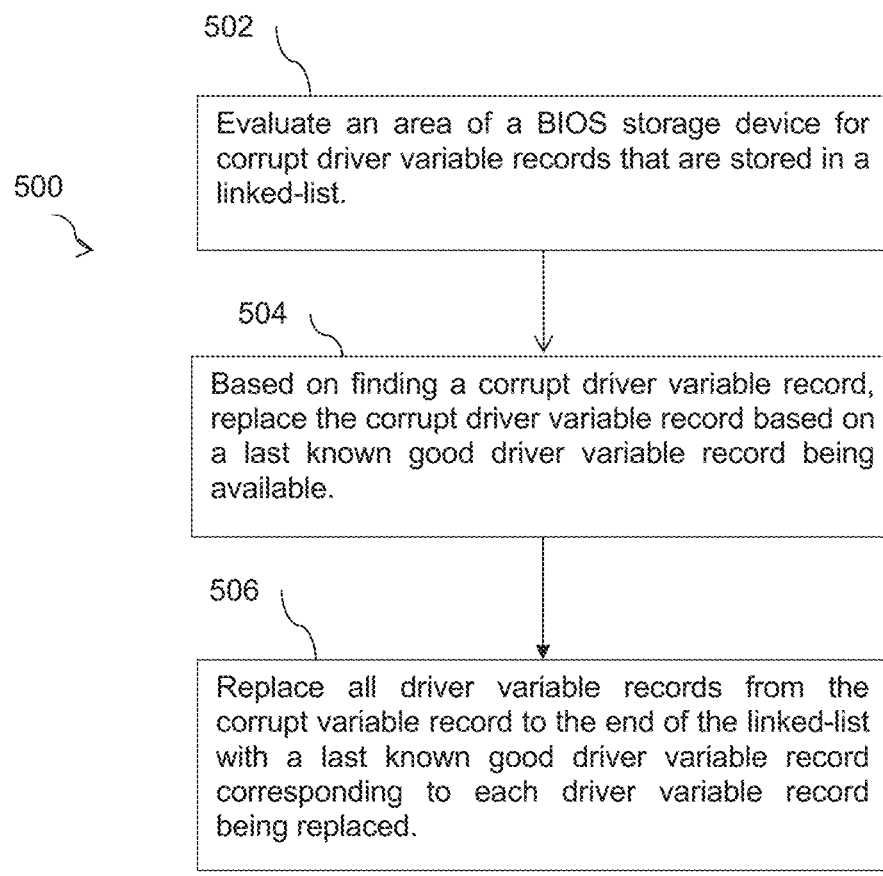

FIG. 5B shows an alternative method 500 that begins with both blocks 502 and 504 as discussed above but continues at block 506. The alternative method 500 continues at block 506 by replacing all driver variable records from the corrupt variable record to the end of the linked-list with a last known good driver variable record corresponding to each driver variable record being replaced. The replacement of the linked-list from the corrupt variable to the end of the list may be performed by the corruption remediation engine 104.

If the last known good variable 408 has already been erased due to a garbage collection operation, however, the corruption remediation engine 104 may mark the corrupt variable for deletion then the corruption detection engine 102 may continue down the list to determine if the remainder of the list is also corrupt. If the remainder of the list is not corrupt, then, then the corruption remediation engine 104 may restore a proper size to the last good variable in the linked-list so that the pointer skips the corrupt variable. The remaining variables may be left alone. By marking the corrupt variable as deleted, the corruption remediation engine 104 may force the illustrative computer system to use a default value for that variable.

However, if the other variables 308 in the linked-list are also corrupt and cannot be replaced, then the illustrative computer system may erase the entire variable storage area 306. Erasing the entire variable storage area 306 may force the illustrative computer system's BIOS to run a complete re-initialization and return all variables 308 to their default values. This last step, however, may result in the loss of user data and changes to the system configuration.

The above discussion is meant to be illustrative of the principles and various embodiments of the present invention. Numerous variations and modifications will become apparent to those skilled in the art once the above disclosure is fully appreciated. For example, the variable corrective driver may be contained within the BIOS storage system or be a stand-alone driver periodically ran by a separate region of a computer system. It is intended that the following claims be interpreted to embrace all such variations and modifications.

What is claimed is:

1. A system, comprising:
 a BIOS storage device including a plurality of driver variable records, a corruption detection engine, and a corruption remediation engine;
 wherein the corruption detection engine is to evaluate the plurality of driver variable records stored in an area of a BIOS storage device for corruption, wherein the corruption detection engine is to determine that a driver variable record is corrupt based on bad information contained in a header of the driver variable record; and
 wherein the corruption remediation engine is to replace the corrupt driver variable record with a last known good version of the driver variable record.

2. The system of claim 1, wherein the corruption remediation engine is to replace the corrupt driver variable record with a default version of the driver variable record.

3. The system of claim 1, wherein the plurality of driver variable records are stored in a linked-list.

4. The system of claim 3, wherein the corruption remediation engine is to replace each driver variable record from the corrupt driver variable record to the end of the linked-list with a last known good version of each driver variable record being replaced.

5. The system of claim 1, further comprising a driver executable in the system to update data in a driver variable record of the plurality of driver variable records.

6. The system of claim 1, wherein each driver variable record of the plurality of driver variable records comprises a header and a data part to store data.

7. A system, comprising:
 a BIOS storage device including a plurality of driver variable records, a corruption detection engine, and a corruption remediation engine,
 wherein the corruption detection engine is to evaluate the plurality of driver variable records stored in an area of a BIOS storage device for corruption,
 wherein the corruption remediation engine is to replace a corrupt driver variable record with a last known good version of the driver variable record; and
 component/function identification instructions executable in the system to direct a component updating a given driver variable record of the plurality of driver variable records to identify the component by including the component's name in a header of the given driver variable record the component is updating.

8. The system of claim 7, wherein each driver variable record of the plurality of driver variable records comprises a header and a data part to store data.

9. A method, comprising:
- updating, by a driver executing in a system comprising a processor, data in a first driver variable record, the first driver variable record including a header and a data part storing the data;
- evaluating, by a corruption detection engine in the system, an area of a BIOS storage device for a corrupt driver variable record that is stored in a linked-list of driver variable records including the first driver variable record; and
- based on finding the corrupt driver variable record, replacing, by a corruption mediation engine in the system, the corrupt driver variable record based on an available last known good driver variable record.

10. The method of claim 9, further comprising replacing each driver variable record from the corrupt driver variable record to the end of the linked-list with a last known good driver variable record corresponding to each driver variable record being replaced.

11. The method of claim 9, further comprising marking the corrupt driver variable record for deletion based on the last known good driver variable record being unavailable.

12. The method of claim 9, wherein the corrupt driver variable record is detected by detecting bad header information in the corrupt driver variable record.

13. A non-transitory computer-readable storage device (CRSD) containing instructions that, when executed, cause a system to:
- evaluate driver variable records stored in a region of a BIOS storage device for corruption by evaluating the driver variable records for bad header information, wherein the driver variable records are structured as a linked-list; and
- based on a driver variable record being corrupt, replace the corrupt driver variable record and subsequent driver variable records to the end of the linked-list with respective last known good driver variable records.

14. The CRSD of claim 13, wherein the instructions when executed cause the system to evaluate the driver variable records for bad links.

15. The CRSD of claim 13, wherein the instructions when executed cause the system to erase the entire region of a memory that stores the variable driver records based on there being a corrupt driver variable record that cannot be replaced.

16. The CRSD of claim 13, wherein the instructions are executed by the system at pre-determined time intervals.

17. The CRSD of claim 13, wherein the instructions when executed cause the system to evaluate the driver variable record for a bad name size of the driver variable record or a bad data size of the driver variable record.

* * * * *